United States Patent
Reinhold et al.

(10) Patent No.: US 10,866,597 B1
(45) Date of Patent: Dec. 15, 2020

(54) DRONE DETECTION AND INTERCEPTION

(71) Applicant: Securus Technologies, Inc., Carrollton, TX (US)

(72) Inventors: Dennis J. Reinhold, Dallas, TX (US); Daniel James Wigger, Prosper, TX (US); Joshua Martin, Frisco, TX (US)

(73) Assignee: Securus Technologies, LLC, Carrollton, TX (US)

( * ) Notice: Subject to any disclaimer, the term of this patent is extended or adjusted under 35 U.S.C. 154(b) by 276 days.

(21) Appl. No.: 15/973,031

(22) Filed: May 7, 2018

(51) Int. Cl.
*G05D 1/12* (2006.01)
*B64C 39/02* (2006.01)
*B64D 47/08* (2006.01)

(52) U.S. Cl.
CPC ............ *G05D 1/12* (2013.01); *B64C 39/024* (2013.01); *B64D 47/08* (2013.01); *B64C 2201/12* (2013.01)

(58) Field of Classification Search
None
See application file for complete search history.

(56) References Cited

U.S. PATENT DOCUMENTS

| | | | |
|---|---|---|---|
| 9,085,362 B1* | 7/2015 | Kilian | B64C 25/68 |
| 9,175,934 B1* | 11/2015 | Kilian | F41H 13/00 |
| 9,529,360 B1 | 12/2016 | Melamed et al. | |
| 9,767,699 B1 | 9/2017 | Borghese et al. | |
| 9,862,489 B1* | 1/2018 | Weinstein | B64C 39/024 |
| 10,249,202 B1* | 4/2019 | Passe | G08G 5/006 |
| 10,540,905 B2* | 1/2020 | Bohanan | G08G 5/0021 |
| 2013/0114787 A1* | 5/2013 | Brown | G01N 23/04 378/57 |
| 2015/0350914 A1* | 12/2015 | Baxley | H04W 12/08 726/11 |
| 2016/0023760 A1* | 1/2016 | Goodrich | G05D 1/12 244/10 |
| 2016/0274578 A1 | 9/2016 | Arwine | |
| 2016/0330771 A1 | 11/2016 | Tan | |
| 2016/0357192 A1* | 12/2016 | McGrew | B64D 47/08 |
| 2017/0059692 A1* | 3/2017 | Laufer | F41G 7/224 |
| 2017/0092138 A1* | 3/2017 | Trundle | B64C 39/024 |
| 2017/0094534 A1 | 3/2017 | Salyers et al. | |
| 2017/0103659 A1 | 4/2017 | Jin | |
| 2017/0169713 A1 | 6/2017 | Gong et al. | |
| 2017/0192089 A1 | 7/2017 | Parker et al. | |
| 2017/0356726 A1* | 12/2017 | Theiss | F41H 13/0006 |
| 2018/0025649 A1* | 1/2018 | Contreras | G05D 1/0033 701/3 |

(Continued)

*Primary Examiner* — Ryan Rink
(74) *Attorney, Agent, or Firm* — Fogarty LLP

(57) ABSTRACT

Embodiments disclosed herein provide for systems and methods for detecting and intercepting drones and drone operators. An example system for disrupting drone attacks comprises a drone detection system configured to detect a hostile drone, a defensive drone control system coupled to the drone detection system and configured to communicate with a first defensive drone, and a first defensive drone configured to receive first data from the defensive drone control system and to use the data to intercept the hostile drone. The system for disrupting drone attacks may further comprise a system configured to identify a control source of the hostile drone, and a second defensive drone configured to receive second data from the defensive drone control system and to use the second data to fly to a location associated with the control source of the hostile drone.

20 Claims, 3 Drawing Sheets

(56) References Cited

U.S. PATENT DOCUMENTS

| | | | |
|---|---|---|---|
| 2018/0103036 A1* | 4/2018 | Fox | F42B 12/44 |
| 2018/0164080 A1* | 6/2018 | Chi-Hsueh | F41H 11/04 |
| 2018/0205446 A1* | 7/2018 | Dowlatkhah | H04B 7/18506 |
| 2018/0335779 A1* | 11/2018 | Fisher | F41G 7/30 |
| 2019/0063881 A1* | 2/2019 | Abramov | G05D 1/0016 |
| 2019/0250641 A1* | 8/2019 | Beer | G08G 5/045 |
| 2019/0258264 A1* | 8/2019 | Bash | G05D 1/102 |
| 2019/0285388 A1* | 9/2019 | Klar | B64C 39/024 |
| 2020/0102075 A1* | 4/2020 | Goodrich | F41H 11/02 |

\* cited by examiner

DRONE DETECTION AND INTERCEPTION

TECHNICAL FIELD

The present disclosure relates to detection and interception of drone or remotely controlled aircraft within the vicinity of controlled-environment facilities.

BACKGROUND

Remote-controlled aircraft have become popular in recent years due to the availability of relatively cheap recreational models with improved flight characteristics that can be controlled by almost anyone. Small scale, private unmanned aircraft, including Unmanned Aerial Vehicles (UAVs), are commonly referred to as "drones" and are typically controlled using radio frequency devices. The controller may be a dedicated control device, but can also be a smartphone, tablet computing device, or the like. For example, tablet computing devices or smartphones may employ an application program to provide such control, employing the radio and/or Global Positioning System (GPS) functionality of the cell phone or tablet computing device to transmit signals to the drone and using the screen of the device to provide feedback to the user. The ubiquity of the mass consumer and inexpensive drone aircraft is a potential risk to controlled-environment facilities that have a need to limit access for security, safety, and/or privacy concerns. Media reports of negligent, criminal, and/or malicious drone use around airports, military bases, and prisons have become a common occurrence.

Drones are remotely controlled using radio frequency transmissions. Technology exists that could be used to jam cellular, radio, and WiFi signals around a controlled-environment facility thereby preventing drones from being controlled by their operator. However, the Federal Communications Commission (FCC) explicitly forbids the use of such technology to prevent interference with valid uses of other cellular, radio, and WiFi signals. Drone countermeasures, such as net guns, require a defender to be in position to manually identify and target the drone. This typically means that the defender is located at the target site and that the drone is not stopped before reaching the target. Accordingly, other methods of dealing with unwanted and/or malicious drone activity must be employed.

SUMMARY

Embodiments disclosed herein provide for systems and methods for detecting and intercepting drones and drone operators. An example system for disrupting drone attacks comprises a drone detection system configured to detect a hostile drone, a defensive drone control system coupled to the drone detection system and configured to communicate with a first defensive drone, and a first defensive drone configured to receive first data from the defensive drone control system and to use the data to both track and intercept the hostile drone. The system for disrupting drone attacks may further comprise a system configured to identify a control source of the hostile drone, and a second defensive drone configured to receive second data from the defensive drone control system and to use the second data to fly to a location associated with the control source of the hostile drone. The drone detection system may detect the hostile drone using one or more of audio detection, visual detection, thermal detection, radar detection, or radio frequency detection.

The first defensive drone concludes an interception by a collision with the hostile drone or by a near-miss with the hostile drone. The first defensive drone may carry a payload, and may deploy the payload upon reaching a predefined proximity to the hostile drone. The first defensive drone comprises a tracking system configured to allow the first defensive drone to self-track the hostile drone.

The second defensive drone is configured to hover or orbit at the location associated with the control source of the hostile drone. The second defensive drone carries a payload and deploys the payload upon reaching the location associated with the control source of the hostile drone. The second defensive drone comprises a navigation system configured to allow the second defensive drone to self-navigate to the location associated with the control source of the hostile drone. The second defensive drone comprises a camera configured to transmit images and a geo-tracking or navigation system to transmit the coordinates of the location associated with the control source of the hostile drone to the defensive drone control system.

BRIEF DESCRIPTION OF THE DRAWINGS

Figure 1:
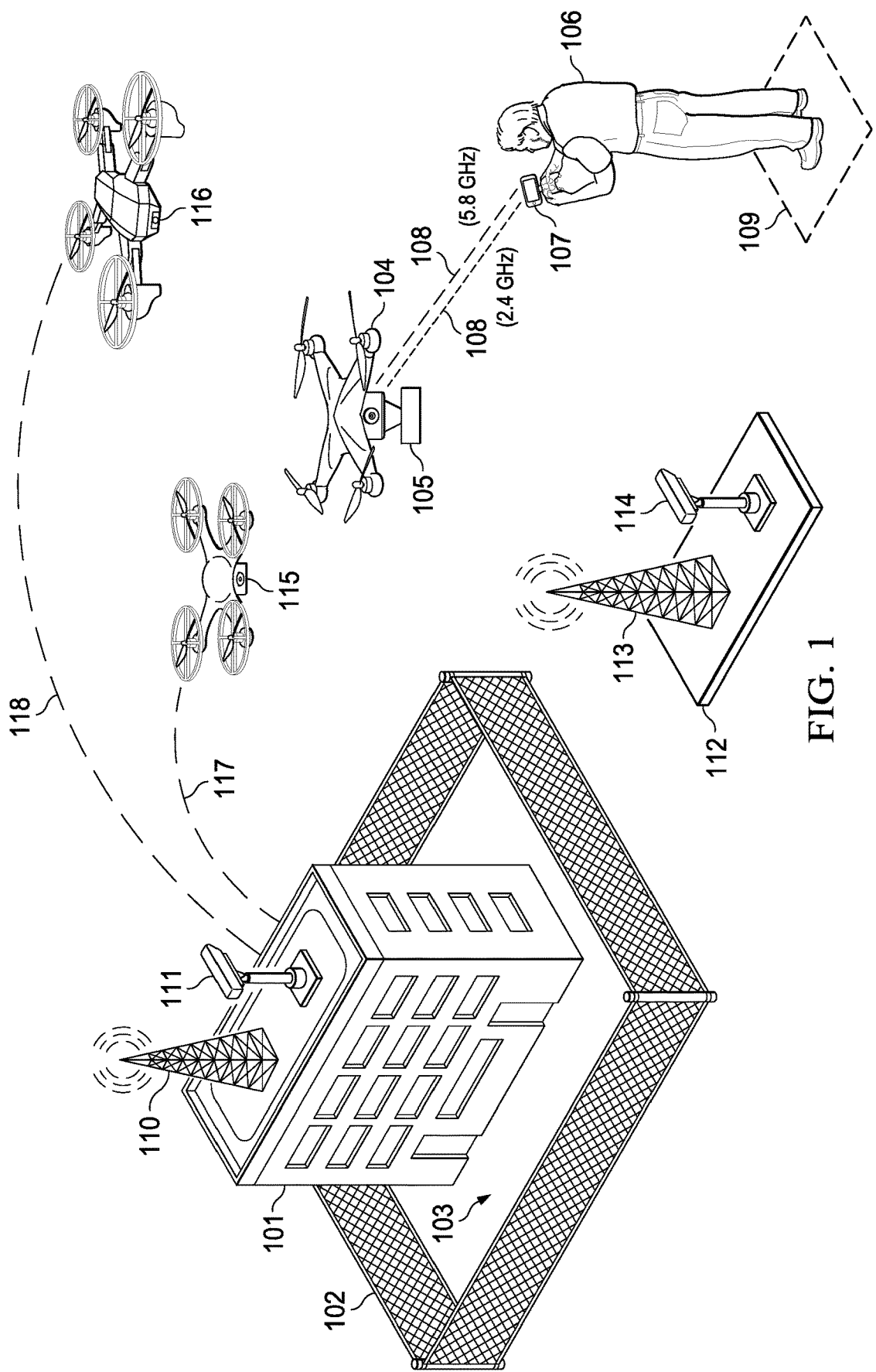

Having thus described the invention in general terms, reference will now be made to the accompanying drawings, which are not necessarily drawn to scale, and wherein:

FIG. 1 is a block diagram illustrating a drone detection and interception system according to an example embodiment.

Figure 2:
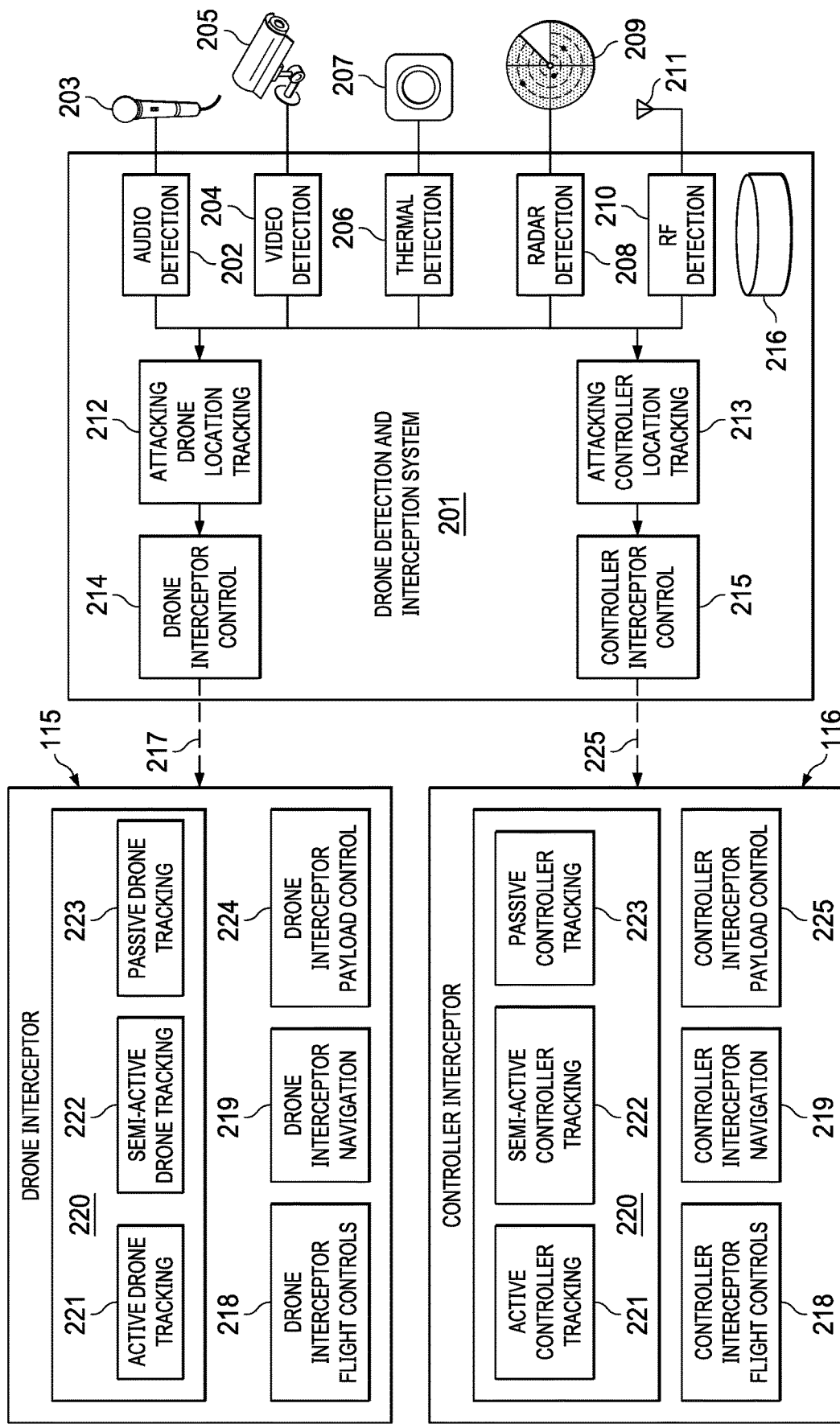

FIG. 2 is block diagram illustrating a system for drone detection and interception according to one embodiment.

Figure 3:
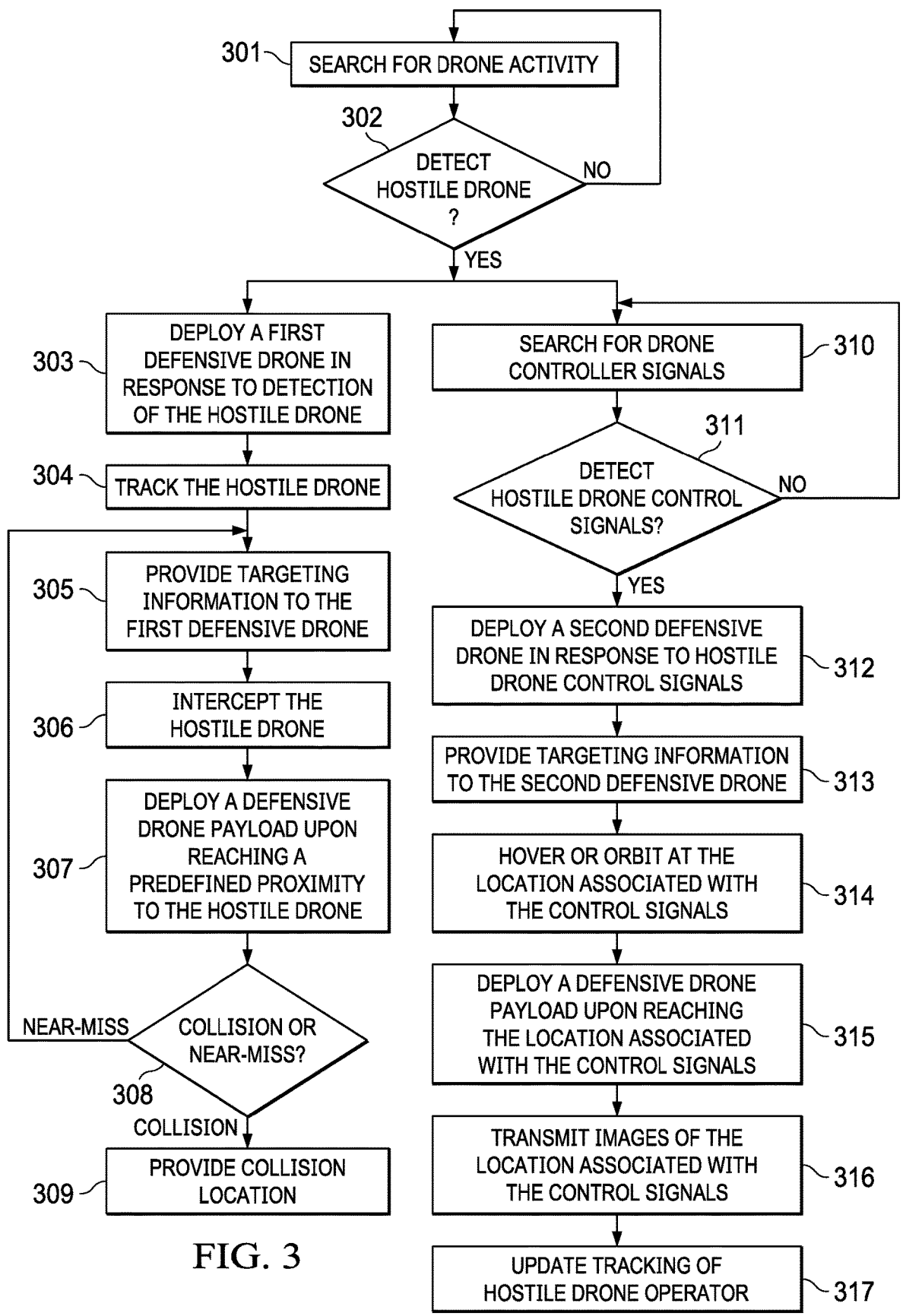

FIG. 3 is a flowchart illustrating a process for disrupting drone attacks according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating a drone detection and interception system according to an example embodiment. Controlled-environment facility 101 may be any building, group of buildings, compound, acreage, campus, base, or station that provides limited and controlled access for security, safety, and/or privacy reasons. For example, controlled-environment facility 101 may be a government building, military base, prison, jail, school, airport, train station, or corporate, educational, or medical campus. Controlled-environment facility 101 may be protected by a fence 102 or other man-made or natural barricade that restricts access to facility 101 and surrounding grounds 103. However, fence 102 has limited effectiveness and cannot keep out objects that go over fence 102, such as items thrown or flown over fence 102. Accordingly, such facilities 101 may be subject to drone attacks as part of terroristic, malicious, and/or criminal activity. Reports of drones interfering with aircraft and airport flight operations are common. Terrorist groups have used drones to drop grenades on military facilities. Drones have also been used to deliver contraband, such as drugs, cell phones, and weapons, to prisoners in correctional institutions.

As shown in FIG. 1, an attacking drone 104, which may have a malicious or contraband payload 105, can be flown over fence 102. Once attacking drone 104 is past fence 102, it can then be flown into a structure at controlled-environment facility 101 and/or drop payload 105 in surrounding area 103. Attacking drone 104 is controlled by an operator 106, who uses a radio controller 107 to control the flight path and activities of drone 104. Attacking drone 104 may be a fixed wing or multi-rotor aircraft type, such as commercially available quadcopter drones.

Controller 107 communicates with attacking drone 104 on one or more frequencies 108. Common frequency bands for controlling commercial drones are 2.4 GHz and 5.8 GHz. Commercial drones often have camera that allows operator 106 to capture aerial video and/or to get a drone's eye-view, which allows operator 106 to fly drone 104 using a first-person view (FPV). To avoid interference, drones use multiple frequencies 108 wherein one frequency is used to control the drone and the other frequency is used for video transmission. Other frequencies, such as 433 MHz, 900 MHz, or 1.2 GHz, may be also be used for drone control and video transmission. Commercial drones typically use spread spectrum transmission techniques on the 2.4 GHz and 5.8 GHz frequencies to minimize interference with nearby drones using the same frequency.

The frequencies 108 used in most commercial drones are considered to be line-of-sight meaning that connection between controller 107 and drone 104 is disrupted when an object (e.g., a building, barrier, or natural feature) comes between the controller 107 and drone 104. The line-of-sight requirement and the signal strength of controller 107 limits the effective range of drone 104. Typical hobby drones have a maximum realistic range of 3 to 5 miles; however, specialized controllers are commercially available that support ranges from 20 to 40 miles. Moreover, it will be understood that military, law enforcement, and proprietary drones may be capable of farther ranges and may use other frequencies and/or communication protocols between controller 107 and drone 104 that are less dependent on line-of-sight communications.

Operator 106 launches attacking drone 104 from a location 109 that allows the controller 107 to maintain a radio frequency (RF) connection with drone 104 during the flight from location 109 to target facility 101. Operator 106 needs minimal space to launch drone 104 and the launch location 109 does not have to be in view of the target facility 101. This makes it difficult to detect and stop the launch of an attacking drone 104, which means the drone 104 must be detected and stopped in-flight to prevent it from reaching facility 101.

In one embodiment, drone-detection systems are installed at controlled-environment facility 101. These systems may comprise, for example, an antenna 110 that uses active or passive methods to detect attacking drone 104. Antenna 110 may be part of a radar system that actively scans for drones near controlled-environment facility 101. Alternatively, antenna 110 may be used to monitor common drone control frequencies to detect when a drone is being operated within RF range of controlled-environment facility 101. Other detection sensors 111 may also be used, such as microphones, cameras, and thermal sensors, that passively search for sounds, video, and/or heat signatures of a drone 104. Any one or combination of these search and detection methods may be used along with any other technologies for detecting and monitoring drones.

In addition to the drone-detection systems 110 and 111 installed at controlled-environment facility 101, other detection systems may be located at an off-site location 112. For example, active or passive antenna 113 and/or microphones, cameras, and/or thermal sensors 114 may search for attacking drones 104. The off-site location 112 may increase the possibility of early detection of drone 104 before it reaches facility 101 and thereby prevent delivery of payload 105. Off-site location 112 may be selected based on geography, such as to place sensors at a higher elevation, or other factors, such as to place sensors near probable drone-launching areas (e.g., parking lots, open fields). In other embodiments, only the sensors 113 and 114 at remote or off-site location 112 are used instead of using sensors at facility 101. Alternatively, multiple remote or off-site locations 112 may be used to ensure broad coverage around facility 101.

Once a drone 104 is detected, a drone detection and interception system may evaluate a threat level for drone 104. Some controlled-environment facilities 101 may be entirely or partially surrounded by a no-fly zone or a no-drone zone. In this scenario, if drone 104 is in the designated no-fly zone, then it is designated as hostile. In other situations, the drone detection and interception system may evaluate the flight path of drone 104. If drone 104 is on a flight path directed away from facility 101 or otherwise unlikely to come within a predetermined range of the facility 101, then the drone 104 may be designated as non-threatening. However, drones on a flight path toward or near facility 101 may be designated as threatening. Once the drone 104 has been detected and evaluated, the drone detection and interception system may then act based on the threat level. For low-level or non-threatening drones 104, the drone detection and interception system may continue monitoring and reevaluating drone 104. Once the drone 104 is designated as attacking or otherwise threatening, the drone detection and interception system may act to oppose attacking drone 104.

The drone detection and interception system may launch one or more defensive drones 115 and 116 in response to an attacking drone 104. Drones 115 and 116 may be launched from controlled-environment facility 101, remote location 112, and/or any other appropriate staging location. Drones 115 and 116 may both be launched from the same location or may be launched from different locations. There may be multiple defensive drone launch locations at or near facility 101. At each defensive drone launch location, there may be multiple defensive drones on standby for launch to oppose an attacking drone 104. In another embodiment, standby defensive drones 115 and/or 116 may be launched before a threat is detected and may be maintained in an airborne holding pattern to minimize response time. The drone detection and interception system can counterattack an attacking drone 104 that is approaching from any direction and/or counterattack multiple attacking drones 104.

Drone 115 is a drone interceptor that is directed by the drone detection and interception system to intercept and collide with attacking drone 104. Drone 115 may be remotely controlled all the way to impact by control signals 117. Alternatively, the drone detection and interception system may guide drone 115 until it acquires attacking drone 104, and then drone 115 is self-guided to intercept and hit drone 104. The mass and/or speed of drone 115 may be selected to increase the likelihood that attacking drone 104 is damaged and knocked out of the air following impact. Additionally, drone 115 may be hardened or otherwise designed to withstand an impact so that it can continue to pursue attacking drone 104 and inflict additional impacts on drone 104, if needed. Drone 115 may also carry a payload that can be used against attacking drone 115, such as an explosive warhead or objects/liquid that can be dropped on attacking drone 115 to cause it to crash.

Drone 116 is a controller/operator interceptor that is directed by the drone detection and interception system to detect, identify, and highlight operator 106 and/or controller 107. Drone 116 may be remotely controlled all the way to location 109 using control signals 118 and/or may be self-guided to location 109. The operator 106 and/or controller 107 may be detected and tracked using, for example, the remote-control signals 108 between drone 104 and controller 107. Drone 116 may track or home in on signals 108 back to their source. Once drone 116 is above location 109, it may covertly or overtly hover in that location to highlight operator 106. Additionally, drone 116 may carry a camera and/or a geo-tracking system that would allow a remote operator at facility 101 or at location 112 to observe and receive location coordinates to search the general area around location 109 to identify operator 106. Once operator 106 has been identified, law enforcement or other personnel can go to location 109 to interview, arrest, or otherwise interact with operator 106. Drone 116 may also carry a payload that can be used to highlight location 109, such as lights, flares, or smoke. If operator 106 attempts to flee location 109 on foot or in a vehicle, drone 116 can follow operator 106 to assist investigating personnel in tracking and catching operator 106. Drone 116 may also provide geolocation coordinates for operator 106 to the investigating personnel.

FIG. 2 is block diagram illustrating a system for drone detection and interception according to one embodiment. Drone detection and interception system 201 may be configured to protect a controlled-environment facility or any other location from drone attacks. Drone detection and interception system 201 may use a plurality of different drone detection and tracking technologies.

Audio detection subsystem 202 may use one or more microphones 203 that capture sound near the controlled-environment facility. The sound may be processed in real-time to search for audible and inaudible sounds at frequencies associated with drone aircraft, such as engine or propeller noises. An array of directional microphones 203 may be used to determine a general direction from which such sounds are detected and thereby identify a probable direction of a drone attack. The sensitivity of the microphones 203 and the volume of the noise source will determine the distance at which a drone can be detected using audio detection 202.

Video detection subsystem 204 may comprise one or more cameras 205 that capture images near the controlled-environment facility. The video frames may be processed in real-time to search for images that are associated with drone aircraft, such as shapes that match drone silhouettes from different perspectives. Alternatively, an object's motion across several frames may be analyzed to detect and identify drone flight patterns, which may be useful to screen out birds, balloons, airplanes, or other nonthreatening objects. An array of cameras 205 may be used to cover all directions around the controlled-environment facility simultaneously.

Thermal detection subsystem 206 may comprise one or more heat sensitive detectors 207 that capture, for example, infrared images near the controlled-environment facility. The infrared images may be processed in real-time to search for objects that are hotter than the surrounding area or background. Certain infrared frequencies may be associated with drone aircraft to help distinguish drones from other objects. This method of detecting drones may be more successful to detect gas-engine powered drones, which are likely to operate at hotter temperatures than drones with electric motors. An array of heat sensors 207 may be used to cover all directions around the controlled-environment facility simultaneously.

Radar detection subsystem 208 may comprise an antenna 209 that uses radio signals to search near the controlled-environment facility. The contacts detected may be processed in real-time to search for objects that may be drone aircraft. Radar signals that are sensitive enough to detect drone aircraft may also detect birds, so an object's motion over time may need to be analyzed to distinguish drone flight patterns from birds. The small radar cross-section of most drone aircraft may limit the effective range and usefulness of radar detection.

Radio Frequency (RF) detection subsystem 210 may comprise one or more antennas 211 that capture RF signals near the controlled-environment facility. The RF signals may be processed in real-time to search for signals that are associated with drone aircraft. The signals used to remotely control commercial drones operate on known frequencies. These signals originate from a drone controller, which is associated with the location of the drone operator. Also, the frequencies used to transmit video from the drone to the controller are often known and originate from the location of the drone itself. For example, a drone controller may broadcast control signals on 5.8 GHz, while the drone transmits video signals on 2.4 GHz, or vice versa. An array of antennas 211 may be used to determine a direction from which the drone-related RF signals originate to provide at least a relative bearing to the attacking drone or controller.

Detection subsystems 202, 204, 206, 208, and 210 and sensors 203, 205, 207, 209, and 211 may be located at the controlled-environment facility and/or at other locations (such as facility 101 and/or location 112, FIG. 1). Detection subsystems 202, 204, 206, 208, and 210 provide inputs to location tracking subsystems 212 and 213. The attacking drone location tracking subsystem 212 uses these inputs to identify and track an attacking drone. Tracking subsystem 212 may receive one or more inputs and correlate those inputs to identify an airborne object approaching the controlled-environment facility. For example, captured sounds, thermal signatures, or RF signals along with visual silhouettes or radar cross-sections may be correlated to identify an attacking drone. Similarly, tracking subsystem 213 may receive one or more inputs and correlate those inputs to identify a drone controller near the controlled-environment facility. For example, received RF signals may be correlated to drone control signals. Sensors 203, 205, 207, 209, and 211 may provide at least a direction or bearing to the attacking drone. Radar detection subsystem 208 may also provide a range or distance to determine a precise position for the attacking drone. In other embodiments, bearings from two or more detection subsystems 202, 204, 206, 208, and 210 may be used by location tracking subsystems 212 and 213 to triangulate the attacking drone's position. Detection subsystems 202, 204, 206, 208, and 210 may provide both an azimuth and elevation for the bearing to the attacking drone.

Drone detection and interception system 201 uses the drone and controller location information from tracking subsystems 212 and 213 to control defensive drones that are used to intercept the attacking drone and to locate the attacking drone's operator. Attacking drone location tracking 212 provides inputs to drone interceptor control 214, which generates control signals for a defensive drone (e.g., drone 115, FIG. 1) that is sent after the attacking drone. Attacking controller location tracking 213 provides inputs to controller interceptor control 215, which generates control signals for a defensive drone (e.g., drone 116, FIG. 1) that is sent after the operator who is using the attacking drone controller.

Drone detection and interception system 201 may have a library of known drone and/or controller profiles 216, such as sounds, thermal signatures, visual silhouettes, radar cross-sections, and/or RF signals associated with known drones. If detected drone or controller information is correlated to a known drone profile, then the function of location tracking subsystems 212 and 213 and interceptor control subsystems 214 and 215 may be enhanced. For example, if the attacking drone's capabilities (e.g., speed, range, maneuverability) are known from a profile, the operation of the attacking drone can be more accurately predicted and anticipated during an intercept.

Drone intercept control 214 sends control signals 217 to direct drone interceptor 115 to intercept and impact the attacking drone (e.g., drone 104). Drone interceptor 115 includes flight control system 218 for controlling drone maneuvering, navigation system 219 for managing current and destination locations, and tracking system 220 for targeting an attacking drone. Drone intercept control 214 may provide real-time control inputs (e.g., pitch, roll, throttle, etc.) to flight control system 218. Alternatively, drone intercept control 214 may provide a current location of the attacking drone, and drone interceptor 115 may use geo-tracking or navigation system 219, such as a GPS system, to fly to that location.

Tracking system 220 may also be used to direct drone interceptor 115 to the attacking drone using one or more of active tracking 221, semi-active tracking 222, or passive tracking 223. Active tracking 221 is any self-contained tracking device on drone 115, such as an onboard radar system that transmits and receives radar signals. Semi-active tracking 222 uses signals reflected from the target as guidance. For example, the drone detection and interception system 201 may target an attacking drone using a radar or laser signal, and the reflected radar or laser energy is used to guide drone 115. Passive tracking 223 uses information, such as noise or heat radiated by the attacking drone itself, to track the attacking drone. Passive tracking 223 may also use a camera to track a visual image of the attacking drone. Drone interceptor 115 may use any appropriate technique, such as pure, lead, or lag pursuit, to intercept the attacking drone. The intended conclusion of the intercept by drone 115 is to create an actual, physical collision with the attacking drone. The location of the collision and/or the location of the crashed attacking drone is reported back to the drone detection and interception system 201 so that personnel can be dispatched to recover the attacking drone and its payload for analysis and investigation.

In addition to an actual collision or impact between the drone interceptor 115 and the attacking drone, other means may be used to increase the chances of downing the attacking drone. These may be used in the event of a near miss or in addition to a collision intercept. A payload control 224 manages deployment of a payload carried by drone interceptor 115. The payload may be, for example, an explosive warhead, objects (e.g., nets, sticks, wire, ropes, etc.), or liquid (e.g., water, paint, etc.) that can be dropped or sprayed on attacking drone 115 to cause it to crash. The explosive warhead may be nonlethal to humans, but lethal to flying objects, such as by ejecting or dropping low-speed shrapnel that would not harm a person but would damage a drone operating at flying speed. If drone interceptor 115 deploys its payload at or near the expected point of collision, the payload may still cause the attacking drone to crash even if there was a near-miss. For example, if nets or other objects get entangled with a propeller, if paint blinds a drone FPV camera, or if water shorts out or stalls an engine, then the attacking drone would likely crash or be uncontrollable.

Controller intercept control system 215 sends signals 225 to cause controller interceptor 116 to locate and identify the operator 106 and/or controller 107. Control interceptor 116 includes flight controls system 218, navigation system 219, and tracking system 220, which are similar to the components of drone interceptor 115. Controller intercept control 215 may provide real-time control inputs (e.g., pitch, roll, throttle, etc.) to fly controller interceptor 116 to the operator's location 109. Alternatively, controller intercept control 215 may provide a current location of the operator 106 or controller 107, and controller interceptor 116 may use its navigation system 219 to fly itself to that location (e.g., location 109, FIG. 1). In another embodiment, controller intercept control 215 may provide other identifying information, such a frequency 108 broadcast by the controller 107, that the controller interceptor 116 can use to home in on the operator 106.

Rather than collide or impact the operator 106 or controller 107, the intent of controller interceptor 116 is to locate and identify operator 106. Controller interceptor 116 may have an onboard camera, for example, for sending images of the location 109 back to the drone detection and interception system 201. Those images may be analyzed by a user to identify and further track operator 106. Controller interceptor 116 may also send geolocation coordinates to assist in tracking operator 106. If operator 106 attempts to flee, controller interceptor 116 can follow and update the operator's position. When the operatory 106 is in a relatively stationary position, controller interceptor 116 may hover or orbit near that position. The operator's position can be highlighted using a payload 225 on the controller interceptor to guide security or law enforcement personnel to the operator. For example, controller interceptor 116 may drop flares, smoke, or other markers near location 109.

FIG. 3 is a flowchart illustrating a process for disrupting drone attacks according to one embodiment. In step 301, a drone detection and interception system searches for drone activity. Drone activity can be detected using, for example, one or more of audio detection, visual detection, thermal detection, radar detection, or radio frequency detection. In step 302, the system evaluates if a hostile drone has been detected. If no drones have been detected, or if a drone is determined to be non-hostile, then the process returns to step 301 to continue searching.

In step 303, a first defensive drone is deployed in response to detection of the hostile drone. In step 304, the hostile drone is tracked by the drone detection and interception system. The tracking may be achieved by one or more methods, such as using audio, visual, thermal, radar, and/or RF signal tracking. The initial detection and the tracking may be performed at a controlled-environment facility or other potential target of hostile drones. Alternatively, or in addition, the detection and tracking may be performed at a location remote from the controlled-environment facility or other potential target. Tracking from multiple locations may be used to triangulate the hostile drone's location and flight path.

In step 305, targeting information is provided to the first defensive drone. The targeting information may be configured to control a flight path of first defensive drone in a manner to intercept the hostile drone, such as by remotely controlling the first defensive drone. Alternatively, the targeting information may be configured to allow the first defensive drone itself to target and track the hostile drone. For example, the first defensive drone may have a tracking and guidance capability to use active, semi-active, or passive tracking of a hostile drone.

In step 306, the first defensive drone intercepts the hostile drone. The first defensive drone may pursue the hostile drone using any appropriate intercept techniques or geometry based upon initial locations, environmental conditions, atmospheric conditions, drone speeds, or other factors. In step 307, a payload is deployed by the first defensive drone upon reaching a predefined proximity to the hostile drone. Preferably, the intercept ends in a collision, but the deployment of a payload, such as an explosive, object, or liquid, will improve the chances that the hostile drone is forced to crash.

In step 308, the drone detection and interception system determines if the intercept ended in a collision or near-miss between first defensive drone and the hostile drone. If the intercept ended in a near-miss or if the hostile drone is not downed, then the process returns to step 305 and the drone detection and interception system provides updated targeting information to the first defensive drone so that it can reacquire the hostile drone and attempt another interception and collision.

In step 309, if the interception ended in a successful collision that downed the hostile drone, a collision location is provided to the drone detection and interception system so that the hostile drone and any payload can be recovered.

When the hostile drone is detected in step 302, in addition to deploying the first defensive drone in step 303, the drone detection and interception system begins searching for hostile drone controller signals in step 310. In step 311, the drone detection and interception system evaluates if hostile drone controller signals have been detected. If no drone controller signals have been detected, then the process returns to step 310 and the searching continues.

In step 312, if hostile drone controller signals have been detected, then a second defensive drone is deployed. In step 313, targeting information is provided to the second defensive drone. The targeting information may be configured to control a flight path of second defensive drone in a manner to fly the second defensive drone to a location associated with the control signals, such as by remotely controlling the second defensive drone. Alternatively, the targeting information may be configured to allow the second defensive drone itself to target and track the location associated with the control signals.

In step 314, the second defensive drone hovers or orbits at the location associated with the control signals. In step 315, a defensive drone payload is deployed by the second drone upon reaching the location associated with the control signals. This payload may be, for example, flares, smoke, or other markers that highlight the location associated with the control signals to aid in directing security or law enforcement personnel to the location. In step 316, images are transmitted from the second defensive drone to the drone detection and interception system of the location associated with the control signals. In step 317, the tracking of the hostile drone operator is updated, such as further location tracking if the operator attempts to flee the original location.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for disrupting drone attacks, comprising:
a drone detection system configured to detect a hostile drone and identify a control source of the hostile drone;
a defensive drone control system coupled to the drone detection system and configured to communicate with at least a first and a second defensive drone;
the first defensive drone configured to receive first data from the defensive drone control system and to use the first data to intercept the hostile drone; and
the second defensive drone configured to receive second data from the defensive drone control system and to use the second data to fly to a location associated with the control source of the hostile drone.

2. The system of claim 1, wherein the drone detection system detects the hostile drone using one or more of audio detection, visual detection, thermal detection, radar detection, or radio frequency detection.

3. The system of claim 1, wherein the first defensive drone concludes an interception by a collision with the hostile drone or by a near-miss with the hostile drone.

4. The system of claim 1, wherein the first defensive drone comprises a payload, and wherein the first defensive drone deploys the payload upon reaching a predefined proximity to the hostile drone.

5. The system of claim 4, wherein the defensive drone control system controls deployment of the payload.

6. The system of claim 1, wherein the first defensive drone comprises a tracking system configured to allow the first defensive drone to self-track the hostile drone.

7. The system of claim 1, wherein the second defensive drone is configured to hover or orbit at the location associated with the control source of the hostile drone.

8. The system of claim 1, wherein the second defensive drone comprises a payload, and wherein the second defensive drone deploys the payload upon reaching the location associated with the control source of the hostile drone.

9. The system of claim 8, wherein the defensive drone control system controls deployment of the payload.

10. The system of claim 1, wherein the second defensive drone comprises a navigation system configured to allow the second defensive drone to self-navigate to the location associated with the control source of the hostile drone.

11. The system of claim 1, wherein the second defensive drone comprises a camera configured to transmit images of the location associated with the control source of the hostile drone to the defensive drone control system.

12. A method for disrupting drone attacks, comprising:
detecting a hostile drone;
deploying a first defensive drone in response to detection of the hostile drone;
tracking the hostile drone;
providing first targeting information to the first defensive drone, the first targeting information configured to control a flight path of the first defensive drone in a manner to intercept the hostile drone or to allow the first defensive drone to target and track the hostile drone;

intercepting the hostile drone by the first defensive drone;

detecting control signals associated with the hostile drone;

deploying a second defensive drone in response to detection of the control signals; and providing second targeting information to the second defensive drone, the second targeting information configured to control a flight path of the second defensive drone in a manner to fly the second defensive drone to a location associated with the control signals or to allow the second defensive drone to target and track the location associated with the control signals.

13. The method of claim 12, wherein the hostile drone is detected using one or more of audio detection, visual detection, thermal detection, radar detection, or radio frequency detection.

14. The method of claim 12, wherein the first defensive drone concludes an interception by a collision with the hostile drone or by a near-miss with the hostile drone.

15. The method of claim 12, further comprising:

deploying a first defensive drone payload upon reaching a predefined proximity to the hostile drone.

16. The method of claim 12, further comprising:

hovering or orbiting by the second defensive drone at the location associated with the control signals.

17. The method of claim 12, further comprising:

deploying a second defensive drone payload upon reaching the location associated with the control signals.

18. The method of claim 12, further comprising:

transmitting from the second defensive drone images of the location associated with the control signals.

19. A method for disrupting drone attacks, comprising:

detecting a hostile drone and control signals associated with the hostile drone;

deploying a hardened interceptor drone in response to detection of the hostile drone;

tracking the hostile drone;

providing first targeting information to the hardened interceptor drone, the first targeting information configured to control a flight path of the hardened interceptor drone in a manner to intercept the hostile drone or to allow the hardened interceptor drone to target and track the hostile drone;

intercepting and colliding with the hostile drone by the hardened interceptor drone;

determining whether the hostile drone has been knocked out of the air;

repeating intercepting and colliding with the hostile drone by the hardened interceptor drone and determining whether the hostile drone has been knocked out of the air, until the hostile drone has been knocked out of the air;

deploying, concurrent with deployment of the hardened interceptor drone, a controller interceptor drone in response to detection of the control signals; and providing second targeting information to the controller interceptor drone, the second targeting information configured to control a flight path of the controller interceptor drone in a manner to fly the controller interceptor drone to a location associated with the control signals.

20. The method of claim 19, further comprising locating, identifying and/or tracking an operator of a controller emitting the control signals, concurrent with the hardened interceptor drone intercepting and colliding with the hostile drone and/or thereafter.

* * * * *